April 5, 1966 C. E. PETTINGALL 3,244,001
AERODYNAMIC VARIABLES SENSING DEVICE
Filed Oct. 5, 1960 3 Sheets-Sheet 1

INVENTOR.
CHARLES E. PETTINGALL
BY
Edwin Coates
ATTORNEY

April 5, 1966   C. E. PETTINGALL   3,244,001
AERODYNAMIC VARIABLES SENSING DEVICE
Filed Oct. 5, 1960   3 Sheets-Sheet 2
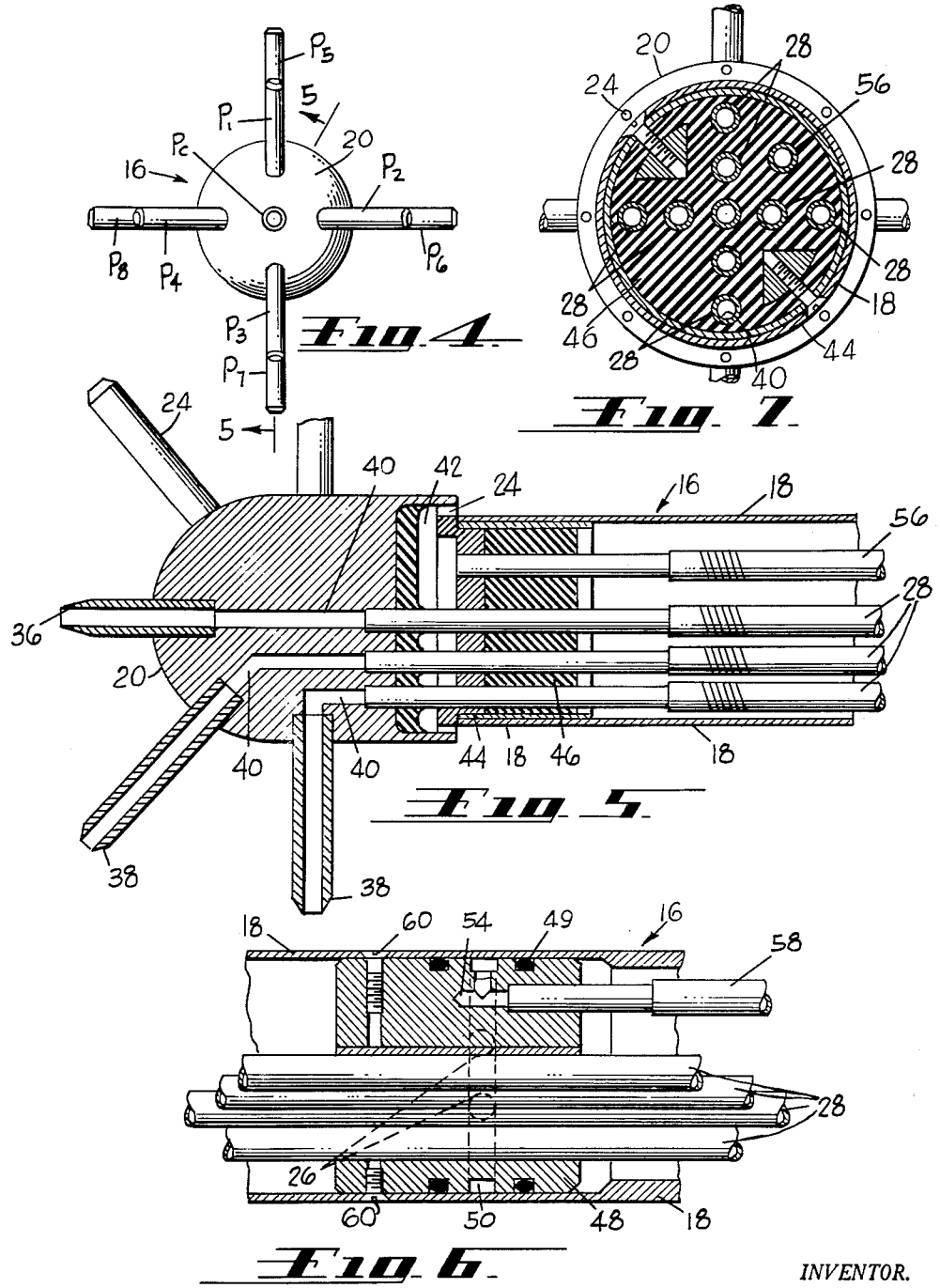
INVENTOR.
CHARLES E. PETTINGALL
BY Edwin Coates
ATTORNEY

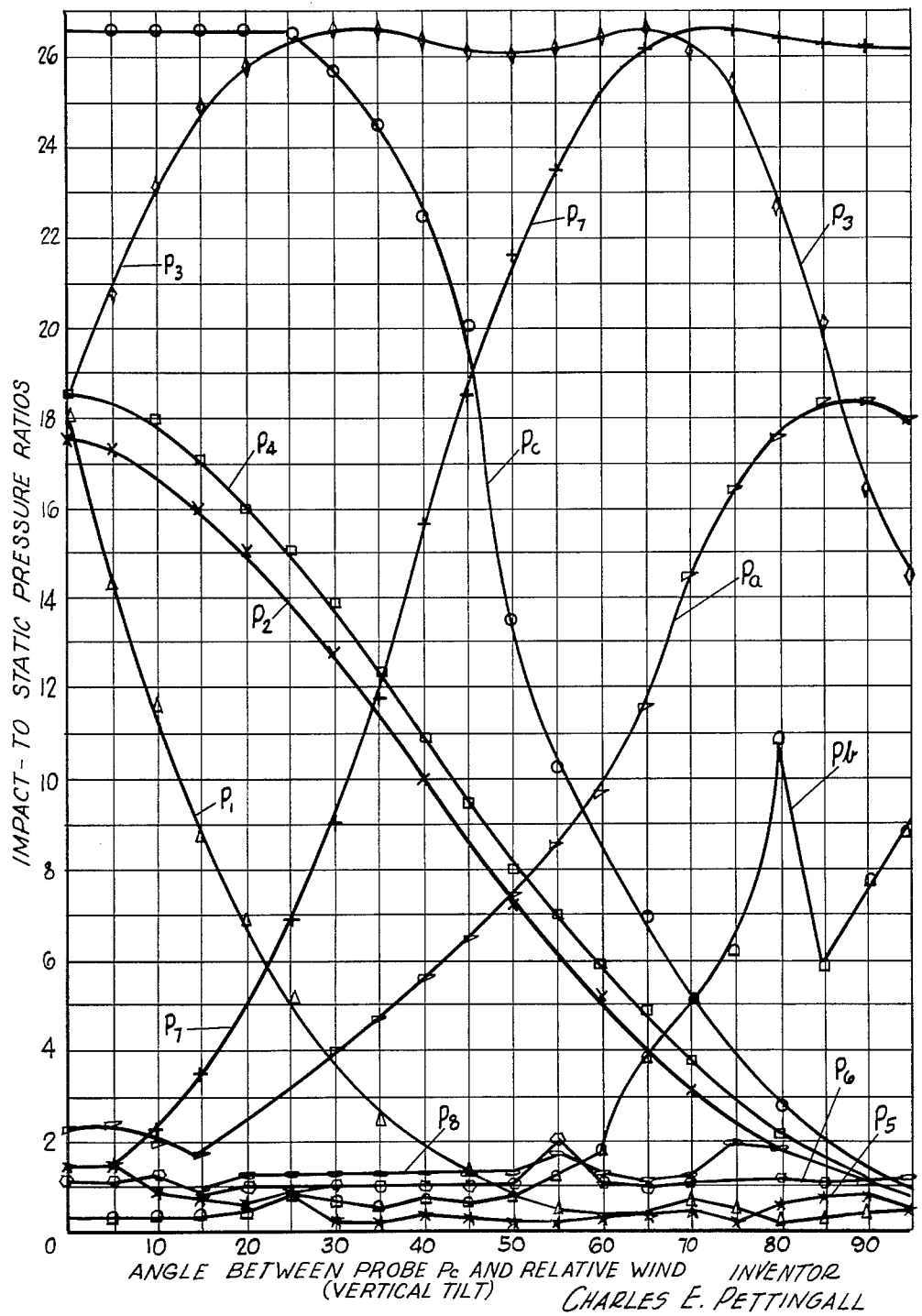

United States Patent Office 3,244,001
Patented Apr. 5, 1966

3,244,001
AERODYNAMIC VARIABLES SENSING DEVICE
Charles E. Pettingall, Los Angeles, Calif., assignor to Douglas Aircraft Company, Inc., Santa Monica, Calif.
Filed Oct. 5, 1960, Ser. No. 60,721
9 Claims. (Cl. 73—180)

This invention relates to the dynamic-instrumentation of vehicles that move immersed in a fluid. It is especially concerned with sensing, or "picking-up," certain variables due to fluid-flow and/or to movement through the fluid, these variables all being essential to the safe or proper operation of the vehicles.

Among these variables may be mentioned static and dynamic pressures; total head; angles of attack and sideslip (the yaw angle, wherein the direction of the undisturbed airflow past the body is taken as the reference direction) and true speeds through the fluid medium.

Such sensing devices, usually called "probes," ordinarily consist of a boom attached at the one end to an airplane's fuselage-nose, fin, or wing tip or to a missile's nose and protruding therefrom. The boom is forwardly terminated by a sensor-head, from the front face of which protrudes a plurality, never heretofore more than five in number, of orificed sensing tubes, or sensors, angularly mutually so arranged as to pick up total, impact, static, differential and dynamic air pressures in substantially undisturbed free air and resolve them into rearwardly directed differential, total, dynamic, or static pressures, which are then transduced into airspeed, Mach number, altitude, and angles of attack and sideslip.

It is impossible for contemporary sensors to accurately sense or pick up any of the foregoing variable when the angle between the fore and aft center line of the senor head and the airstream exceeds approximately 25° due to airplane attitude, that is, when the "relative wind" is off as much as 25°–30° from said axis, especially at hypersonic speeds. One of the chief reasons for this fact is that interference occurred in the prior art between the sensing tubes and the head and that in the design of the latter heads, certain critical dimensions and geometry constituting part of the present invention, were ignored.

Basically, therefore, this means that no known previous device has been capable of accurately sensing and employing total air pressure anywhere near an angular range on the head that approaches 180° of included angle or total arc; or of picking up and utilizing static pressures over a range of angles between the airstream, or relative wind, anywhere near 60°, or more.

By means of the present invention, aerodynamic probes are enabled, by an unique number, and novel arrangement, of orificed sensing tubes on a spherico-cylindric head, and of static orifices on both the head and the boom, to establish and sense a substantially greater and wider range than usual of pressure differentials between cooperating tubes, as well as to enable determination of the change of differential pressure between the tubes when some of them are in alignment with the changed direction of relative wind and some are out of alignment, due to change in angles of attack and sideslip of the vehicle. Thereby is widened the range of angles of utility of probes in sensing total pressure, angles of attack, angles of sideslip, true airspeed, altitude and dynamic and static free airstream pressures and this applies not only to airplanes, but to VTOL's and missiles as well.

Since it is adapted for use in hypersonic aircraft and missiles, the invention is able to maintain high sensitivity even at unusually high Mach numbers, so that no separate Mach number sensitivity-responsive means are required.

Broadly to achieve these and other ends, the invention provides a probe consisting of an improved boom carrying an improved spherico-cylindric head which bears a critical number of orificed sensor members or pressure-pickup tubes protruding from its spheric forward surface and also from the periphery of its cylindric side surface. These tubes are predeterminedly so located with reference both to the various angular attitudes of the vehicle and to the shock waves the probe ends generate at hypersonic speeds, and to each other, as to obtain, between any two adjacent tubes, the "best" total pressure head and the "best" static pressure pickup that is possible, and does so, for the first time in this art at all vertical airflow angles up to at least 60°, and up to 90°, in effect, for obtaining sideslip angle measurements.

The critical quantity or number of pickup probes for achieving the present purposes has herein been ascertained to be nine in number. With less than this number, the novel range of measurement of angular attitudes of the vehicle cannot be obtained; with more than this number, in hypersonic flight particularly, there will occur such interference between the tubes and between shock waves emanating from the outer ends of adjacent tubes as would render the device substantially useless, given that the tubes must have a certain minimum length in proportion to the diameter of their spheric supporting head and a certain diameter in porportion to their own lengths.

In one of the presently contemplated forms or species of the invention, these nine tubes are, generally, arranged as follows: there are four of these tubes mutually spaced apart 90° on, or near, the periphery of the cylindric rearward end of the head and one, shorter, tube lying on the fore-aft center line of the head and, of course, protruding forwardly from the foremost spheric surface of the head. Two additional tubes are located in the central vertical plane of the semi-sphere and two tubes are located in the central lateral plane of the semisphere, each of said four tubes lying at 45° to both the central tube and the adjacent peripheral tube.

The rear, exposed, circular face of the "head" element bears eight equidistantly spaced static pressure pick-up, non-tubular orifices, and two pairs of non-tubular static orifices are located on the boom itself, some distance rearwardly of the head, the pairs lying 180° apart with reference to the periphery of the boom. The base-static orifices are accurate through at least 60° of angular change of airflow angle of the vehicle. The boom static orifices are accurate up through at least 20°.

The central tube has its outer end portion preferably externally chamfered at an angle correlated to the highest Mach number which the particular vehicle will reach in flight, thus to fit the entering edge of the sensor into the inevitable shock wave created thereby at substantial Mach numbers. The invention comprehends, however, that the chamfer may be internal in some instances. The central tube is inherently less sensitive to all changes of airflow angle of the vehicle whereas the other tubes are more sensitive thereto. All the remaining eight tubes have their forward ends chamfered, on their external surfaces at an angle similarly correlated to said Mach number and shock waves, as well as to render these eight tubes more sensitive to changes of airflow angle of the vehicle.

It is to be observed that if the airflow angle of the vehicle is such as to disable a peripheral tube from picking up the impact or dynamic pressure in combination with the central tube, then one of the 45° angled tubes lying intermediate to the central tube and the disabled peripheral tube, that is, the adjacent 90° positioned one, will then take over the function of the disabled 90° tube and pick up, with the central tube, the desired pressure, working well in combination with the central tube.

The central tube can be relied upon, for accurately picking up total and differential pressures to be transduced into Mach numbers in cooperation with a Machmeter connected to static pressure; true airspeed, total head and airflow angle of the vehicle up through at least 20° of inclination of the craft; above this angle, it combines functionally with the adjacent 45° tube or, on occasion, the peripheral tubes that then pick up static pressure so as to enable transducing of these pressure differentials into Mach numbers with a Machmeter, true airspeed, total head and airflow angle, as well as necessarily combining with the central tube to enable pickup and transducing of differential pressures for angles of attack and sideslip. This it does especially well in aircraft and VTOL's, although perhaps not so accurately reacting to 90° angular attitude changes as in the case of missiles only. In the latter utilization, the orifices in the back face of the head function accurately for static pressures, missile Mach numbers, and airflow angles. The two pairs of static pressure orifices in the boom itself are more or less limited to vehicle angles not much greater than 20° for accurately picking up these variables in aircraft, but in missiles the statics in the head function accurately above 20° and, in fact, up to approximately 90° of change of missile airflow angle with reference to the missile's original airflow angle.

As is conventional in the case of aerodynamic probe units, the pickup pressures and differential pressures are electro-mechanically transduced by means, located in the fuselage or bodies, these means including computers as well as electro-mechanical transducers. Each tube is flow-connected, through the hollow boom, to a separate transducer and computer, or to an airspeed, or Mach number indicator, as well as to a pressure-responsive altimeter.

At the hypersonic speeds which the present invention takes care of so well and also at sonic, transonic and subsonic speeds, the cooperation of two computers is required to obtain angles of attack and of side-slip and this is achieved in a manner well known in the computer art.

However, attack angles do not affect sideslip angle readings and vice versa. In reading these computers, one may well consider the three highest readings, for a given variable.

Summarizing, the invention achieves its advanced results by providing a probe-assembly that senses more accurately than conventional probes, hypersonic airflow inclinations, total head or pressure differential pressures and static pressures, for both aircraft and missiles. The nine sensors are so arranged on the spheric head as to enable quite accurate determinations of changes of differential pressures between any two sensors, properly positioned to this end with reference to the relative wind by changes in vehicle speed and airflow angle. By sensing the difference in pressure between the probes on the head, the angle between the head and the relative wind direction can be determined.

FIGURE 9 shows a spheric head with sensing probes. Probes $P_2$ and $P_4$ exemplify any two probes at a 90° angle and coplanar with a probe half way between them exemplified by axial probe $P_c$. Angle $\alpha_2$ represents the angle between the component of the relative wind direction in the plane of probes $P_2$ and $P_4$ and the intermediate probe $P_c$, and angles $\alpha_1$ and $\alpha_3$ represent the angles between that component of the relative wind direction and the probes $P_2$ and $P_4$ respectively. The pressure sensed by the probes is dependent upon the impact pressure $q$ which is generally the difference between the pressure sensed by the probe with the highest pressure reading and the probe having the lowest pressure reading. When the relative wind pressure direction is less than about 25° from axial probe $P_c$ the highest pressure is sensed by axial probe $P_c$, and for wind directions of up to about 60° the openings 24 at the base which sense pressures $P_b$ can be used to obtain the lowest readings.

The angle $\alpha_2$ between the component of relative wind direction and the axial probe $P_c$ is a function of the difference pressure ratio $\Delta P_{2,4}/q$, where $\Delta P_{2,4}$ represents the difference between the pressures at robes $P_2$ and $P_4$ and $q$ represents the impact pressure. Similarly, the angle $\alpha_1$ is a function of $\Delta P_{c,6}/q$ where $\Delta P_{c,6}$ is the difference between pressures sensed at probes $P_c$ and $P_6$, and $\alpha_3$ is a function of $\Delta P_{c,8}/q$. By sensing the pressure at two probes spaced 90° apart and noting the value of $q$, the angle between any probe intermediate the 90° spaced pair and the component of the relative wind direction in the plane of the probe can be computed.

For a given angle between an intermediate probe and the component of relative wind direction, the difference pressure ratio changes with Mach number. This variation with Mach number is called the gain of the system.

By virtue of certain equations hereinafter set forth, which are solved successively in the computers for any one unknown factor at a time therein, any one of the sought angles of the vehicle with respect to the relative wind can be determined; that is, the direction of the relative wind with respect to the fore-and-aft center line of the probe-assembly can be determined and displayed in the computer in the fuselage. Thus, the device is self-calibrating and the onerous project of predetermining these directions in a wind tunnel or pre-calibration before the probe-assembly is installed in the vehicle is totally obviated.

The novel combination of head and sensors with the computer, then, can well be said to be an entirely self-calibrating, aerodynamic variables pickup unit.

In brief, the present device enables, among other things, measurement of airstream total pressure (=impact plus static) through 180°; airstream absolute static pressure; differential pressures; and direction of the relative wind; and it does these things throughout boom (or vehicle's) inclination from 0° to approximately 90°. From these parameters, the airspeed, angles of attack and sideslip, Mach number and dynamic or impact pressure are derived in the computers connected to the device. The base static orifices in the head pick up static pressures up to at least 60° in aircraft, including VTOL's; and up to at least 60° in missiles, and the pressures picked up by the sensors enable ascertainment of static pressures beyond 60° and up to 90°. Airstream flow inclination with respect to the actual heading of the vehicle may be metered well beyond 60° and up to 90°.

There is not one moving part in the probe per se and its sensitivity increases directly with increase of airstream velocity or relative wind, contrary to established instrumentations. The device is also, in effect, self-calibrating per se, as aforesaid.

One of the presently contemplated physical forms of embodiment of these, and other, concepts is representationally depicted in the accompanying drawings, but by way of example, only, and will be described qualitatively hereinafter in conjunction with these drawings.

It is to be definitely understood that these drawings, and this description, are representational only.

In these drawings:

FIG. 5 is a fragmentary, longitudinal substantially central section of the forward portion of the boom, the section being taken on line 5—5 of FIG. 4;

FIG. 6 is a similar section of an intermediate portion of the boom;

FIG. 7 is a section on line 7—7 of FIG. 3, sighting in the direction of the arrows;

Figure 1:
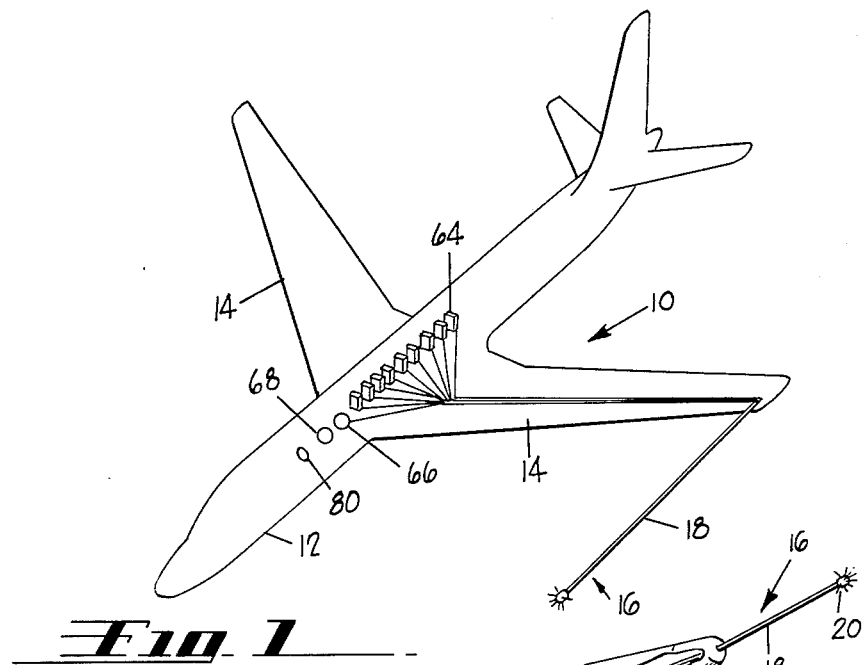
FIG. 1 is a perspective view of a sonic or hypersonic airplane that incorporates the novel aerodynamic pick up probe and associated pressure transducing and indicating instruments.

FIG. 8 is a graph recording the values of the ratios $Pi/P\infty$ of all the nine sensors against the angle between the direction of the relative wind and central probe $P_c$ as the vehicle is rotated upwardly in the vertical plane of the relative wind from a position wherein they coincide to a position wherein they are 90° apart and the relative wind coincides with the probe $P_7$ the latter figure applying also to missiles and VTOL's where $P_1$ is the impact pressure, $P\infty$ is the frustum or static pressure and the ratio thereof is given to present results which are approximately correct for a range of ambient pressures encountered in the use of the device, $P_a$ is the pressure sensed by the sensore 26 in the boom, $P_b$ is the pressure sensed by the sensors 24 at the base of the head, and $P_c$ is the pressure sensed by the axial probe $P_c$; and FIG. 9 is a diagrammatic top plan view of the head-and-sensors unit taken to show the angular relationships between the relative wind and the various sensors' disposition, in this case in yaw, although the same relationships obtain if the action is pitching, or attack-angle, but with the relative wind "lying" in the vertical, rather than the horizontal, plane.

The aerodynamic probe 16 shown in the drawings is predicated upon the fact that the angle of airstream flow, and the total and differential air pressures with relation to the head 20 can be electro-transducer derived, by means of computers, from the relationships of the variations, due to the vehicle's attitudes, in pressures that are detected or sensed by a sensor, or more usually, a conjugate pair of sensors as the boom is inclined at various angles to a reference direction, or fore-aft line, and to the new flow direction, or new relative wind.

It is further predicated upon the fact that for two sensors that are spaced 90° apart, the relative wind angle or airflow direction is derivable from the function $$\frac{\Delta P}{q} = K \sin 2\alpha, \alpha$$

$\alpha$ being the angle between the relative wind and the central sensor.

The function or equation immediately preceeding was derived empirically and has been repeatedly demonstrated to be true and accurate, not only in wind-tunnels, but in test flights and has been universally adopted by those concerned. In this equaiton, $\Delta P$ represents the difference in pressures between any two probes that lie 90° apart in a common, unwarped plane or surface; $q$, as is customary in this art, represents the impact pressure measured as the difference between the pressures read by the highest reading probe and the lowest reading probe; $K$ represents the system gain, and sin $\alpha$ is self-explanatory, taken with the context. The term "central sensor" as used herein is the third sensor that happens, at any particular operational juncture, to lie half-way between the two specified sensors then in action and feeding values onwardly.

That is, referring to FIG. 9, the pressure differential between sensors $P_4$ and $P_2$, with the relative wind making an angle $\alpha$ with the central probe, is $$\frac{\Delta P_{2,4}}{q} = K \sin 2\alpha$$

Wind tunnel tests may well supply $2\alpha$ and K, although these variables may also be ascertained by mathematical analysis.

Further, airstream flow inclination may equally well be determined by emoplying other combinations of two sensors at a time, the sensors being 90° apart, giving $\Delta P_{c,6}/q = (P_c - P_6)/q$; $\Delta P_{8,c}/q = (P_8 - P_c)/q$
$\Delta P_{8,6}/q = (P_8 - P_6)/q$; $\Delta P_{6,4}/q = (P_6 - P_4)/q$
$\Delta P_{8,2}/q = (P_8 - P_2)/q$ and so on; where $\Delta P$ is the desired differential between the total pressure in, or at, the sensor that confronts the relative wind and that on the other sensor of the conjugate pair that is now slanted or aimed away from the relative wind.

Figure 4:
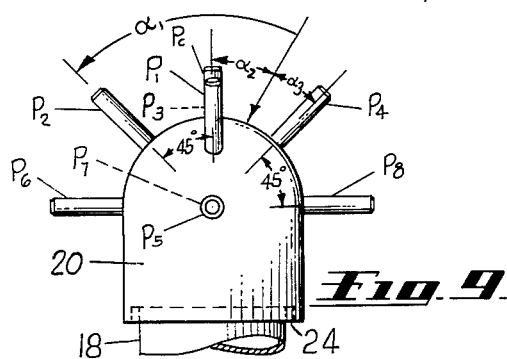
FIG. 4 is a front end view of the probe, showing the arrangement of the novel sensors on the head of the boom.

To facilitate the interpretation of the foregoing paragraph, let it be remembered that: $q$=impact pressure; $\Delta P$ and subscripts refer to the probes designated in FIGS. 4 and 9.

Referring to FIG. 9, sensors $P_2$, $P_c$ and $P_4$, whose extremes $P_2$ and $P_4$ are 90° apart are inclined to the coplanar components of the relative wind by the angles $\alpha$, $\alpha_2$, and $\alpha_3$, as shown.

If we continue to associate angles $\alpha$, $\alpha_2$ and $\alpha_3$ with sensors $P_2$, $P_c$ and $P_4$ as designated in the figure, then for the several combinations of the sensors in the same plane thus related it follows that $$\frac{\Delta P_{8,c}}{q} = K \sin 2\alpha_3 \quad (1)$$

$$\frac{\Delta P_{4,2}}{q} = K \sin 2\alpha_2 \quad (2)$$

and $$\frac{\Delta P_{c,6}}{q} = K \sin 2\alpha_1 \quad (3)$$

Also, $\alpha_2 = \alpha_1$, $-45°$ and $\alpha_3 = 90° - \alpha$.

The specific relationships between and $\alpha_1$, $\alpha_2$ and $\alpha_3$ as used hereinabove, depend solely upon the particular probes then activated or employed and hence any one of $\alpha_1$, $\alpha_2$, and $\alpha_3$ can be activated for cooperative functioning.

From the Equations (1), (2) and (3) $2\alpha$ and K can be determined by the process of electronically solving simultaneous equations in the computers. These facts also demonstrate that it will not be necessary to run the device through wind tunnel calibration procedures before use and that the device is, instead, self-calibrating.

Alluding to the manner in which the various pressures are selected which are to be fed into the computers, let it be noted that in order to determine the desired angles in any given plane, i.e., angles of attack and sideslip, if the relative wind happens to be inclined to the centerline of the boom at an angle less than, for example, 25°, then the probes mounted 45° from the centerline of the boom come into use to determine the angles sought. If the relative wind is at more than 25° to the centerline of the boom, the center probe and the 90° probes will act to determine these angles.

Referring now more in detail to the particular construction depicted representationally in the drawings, there is illustrated in FIG. 1 a transonic, or sonic airplane 10 having a fuselage 12 supporting a pair of wings, or wing-halves, 14.

To the leading edge of the wing tip region there is mounted a probe unit consisting of a boom 18 long enough to dispose the spheric head 20 and the probes in more or less undisturbed, free, airstream or airmass.

Conduitry leads from the probes and head through the boom, and along the interior of the wing to each of nine computers of known design and function for translating the various differential and absolute air pressures into figures indicating the aerodynamic variables sought. There is conduitry also connected to a true indicated airspeed meter 66, and altimeter 68, and a Mach meter 80.

Figure 2:
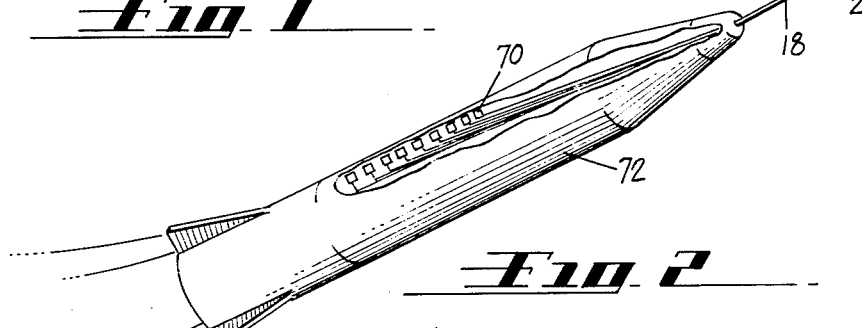
FIG. 2 is a similar view of a guided missile incorporating the novel probe and associated telemetering apparatus for tranducing the picked-up pressures and transmitting them to digital computers, etc., not shown but constituting conjugate ground equipment.

In FIG. 2 the invention is shown as applied to a guided, or ballistic missile 72, the probe assembly 16 being substantially identical with that shown in FIG. 1 except that its boom is shorter and that its pressure pickups are connected to telemetering apparatus, 70.

It is also to be appreciated that the present probe is equally well applicable to VTOL, or vertical take-off and landing airplanes. Further, it would not surpass the scope of the present concepts to apply same to undersea craft, such as submarines, torpedoes, bathyscaphes and the like in picking up certain relative fluid-flow variables, merely applying the present device to the measurement of hydrostatic pressure to give the submerged body's depth; dynamic pressure for its speed; and differential pressures for the submarine's diving or surfacing inclinations and its roll and pitch angles as well.

Figure 3:
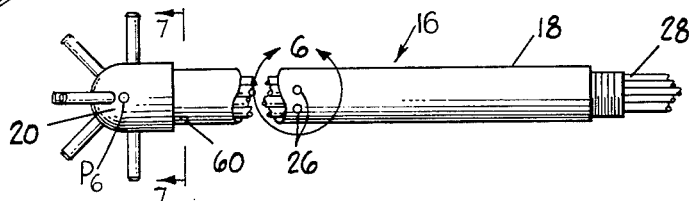
FIG. 3 is a fragmentary side view of the novel probe minus its wing-attachment base, showing the sensors-bearing head, the boom and the pressure-transmitting conduitry.

As shown in FIGS. 3 and 5, the boom is a hollow elongated cylindric article attached at one end to the vehicle, the opposite end receiving the neck 44 of the head 20. Head 20 is itself of semi-spheric or spherico-cylindric shape and bears a critical ratio to the boom diameter, preferably of the order of 32 to 29. The head's spheric diameter bears the critical ratio preferably of the order of 27 to 32 to the fore-aft length of the head, minus its neck 44.

Mounted in the head, are a plurality of pick-up sensors or orificed-end tubes forming the probes $P_c$, $P_1$, $P_2$ etc. Each sensor consists of a hollow-forwardly orificed member seated tightly at its rear end portion in a bore provided therefor in the head.

The number nine is critical, and has been determined by the present invention to be that number of sensors which is the only number that is capable of achieving all the broad and specific objectives of this invention. These objectives, briefly, are (1) to substantively extend the range of pickup of airflow angles of the vehicle in attack and sideslip heretofore achievable by aerodynamic probes, (2) without thereby, by reason of the number of sensors, setting up mutual interference between the pressure fields, "wakes" shock waves emanating from each tube end in high-speed flight, particularly in hypersonic flight.

Furthering the concept of a critical number of sensors, the invention conceives of an unusual arrangement of the sensors with respect to each other and to the head's surface. To provide accurate response to angular attitudes of the vehicle varying almost as much as 90° from a given, or original attitude, an axial sensor $P_c$ is surrounded by eight other sensors, labelled in FIG. 9, $P_1$, $P_2$, $P_3$, $P_4$, $P_5$, $P_6$, $P_7$ and $P_8$. Four of these $P_5$, $P_6$, $P_7$, and $P_8$ are disposed on the periphery of the cylindric rearward portion of the head at quadrantal points, all lying in the same transverse plane, all extending outwardly at right angles to this head portion and each spaced 90° away from the adjacent peripheral members.

Intermediate the central sensor and each one of the peripheral sensors are four other oblique sensors. These sensors, $P_1$ through $P_4$ extend outwardly of the curved front surface of the head from sockets therein and each one lies 45° from the adjacent peripheral sensor and from the central sensor.

Coverage up to 180° and including 90° and 45° is thus obtained, as will hereinafter become apparent.

Finally, the ratio of the diameters of the tubes to their lengths is, by this invention, conceived of as being critical. The ratio of the length to the diameter of the peripheral sensors is in one embodiment of the order of a 5 to 1 ratio and the ratio holds for the intermediate, or "45° sensors." The axial sensor, $P_c$, is shorter than the other eight sensors, but has the same effective diameter.

To obtain accurate pickup at hypersonic speeds, the front end of the axial sensor is here shown as having an external chamfer 36 at an angle of precisely 15°, but the chamfer may be internal if desired, whereas the ends of all other sensors have an external chamfer 38 of precisely at 30°. These critical chamferings not only obviate mutual interference between the pressure fields of adjacent sensors, but "fit" the sensor ends into the shock waves thereat created by hypersonic speeds.

A passageway 40 leads rearwardly in the head from each tube socket to a junction plane for the long conduits 28 in the boom.

A noteworthy feature of the device resides in the fact that the circular or annular flat rear face of the head proper, where it joins the neck 44, is provided with eight equidistant, static pressure pickup orifices, 24, all opening forwardly into a header-chamber or the like, 42. Chamber 42 is connected by a conduit 56 to computer apparatus in the fuselage, if an airplane or VTOL is concerned or to telemetering apparatus in the body, if a missile is concerned. All conduits are supported at their forward portions in a tube sheet or the like, 46.

There are other static pressure pickup means 26 in the device, constituted by two pairs of orifices disposed on diametrically opposite sides of the boom. As shown in FIG. 6, they cooperate with a sealed "spool" 48 which radially fills the boom, is airtightly sealed thereto by O-rings or the like 49, and includes an annular header or collector chamber 50. From chamber 50, a single conduit 58 leads from passage 54 to transducer and computer apparatus in the fuselage, if an airplane is concerned.

Both the neck of the sensing head and the spool itself are removably secured to the boom by set screws or the like, 60.

FIG. 8 graphically demonstrates the performance of the nine probes, $P_1$–$P_8$ and $P_c$ as well as that of the static orifices 24 at various angles of sideslip and attack and, in particular, shows the variation in the impact-to-static pressure ratio for each of the probes as $P_c$ is rotated upward from a position of alignment with the direction of the relative wind, the assembly thus rotating about an axis parallel to probes $P_6$ and $P_8$.

FIG. 9 depicts the various $\alpha$ angles referred to in arriving at the three basal equations set forth supra.

Now more specifically describing the functioning of the head-and-sensors unit, that is, the "pickup" means, this functioning consists of ramifications or combinations of three basic or initial functions: total pressures responses, absolute static pressures responses, and changes in flow inclination or direction of the "relative wind" with respect to the heading of the vehicle and hence to the longitudinal center line of the entire probe, or boom assembly.

The total pressure is the sum of the impact pressure on a tube-end plus the "stagnant air" or "static" pressure there. Due to the versatility of the present device, that one of the nine sensors which at the time most directly confronts the airstream, or which receives same "full on," or lies at 180° to it, gives the highest reading on the transducers or telemetering apparatus, or computers and this is the total pressure magnitude sought.

Absolute, or "pure," static pressures can be obtained (1) by the orifices 24, (2) by the orifices 26, or (3) by any "lowest reading" sensor then aftwardly facing, aimed or directed, but it must lie at least 90° "off" the relative wind.

The angle of inclination of the airstream flow, that is, the angular direction of the relative wind is, briefly, obtained by the difference in readings of the two sensors, lying at 90° to each other, which are best positioned at the time to pick up the differential pressure desired.

The airstream velocity, that is, the true airspeed of the vehicle, is obtained by the difference in pressures between the center sensor and that of orifices 24 or some other sensor then sensing the lowest pressure.

The Mach number is also obtained by the difference in pressure between that of the central sensor and orifices 24, or the sensor at lowest pressure, the transduced result being fed into a conventional Machmeter which also picks up absolute static pressure.

The absolute dynamic or impact pressure, per se, is obtained in the same way as is the airspeed, but is read off on a separate instrument.

Angles of attack and sideslip are obtained by virtue of the conjoint action of any two properly responsive sensors, that is, by 90° opposed sensors best placed by the vehicle's attitude to pick up, or present, the highest $\Delta P$. For example, $\Delta P$ for angles of attack is picked up by sensors $P_3$ and $P_1$ if the angle does not much exceed 45°, upward or downward. If the attack angle exceeds 45°, as it may in missiles or VTOL airplanes, the upward angle of attack is responded to by sensors $P_7$ and $P_c$; if downward, by sensors $P_5$ and $P_c$, and these two cases obtain with accuracy almost up to 90° attack angle. On sideslip of the airplane, or VTOL, to the left and right, not exceeding 45°, sensors $P_2$ and $P_4$ respond or give the best $\Delta P$ reading. If sideslip to the left exceeds 45° then $P_8$ and $P_c$ respond, substantially up to 90°.

That is, the angular attitude of the vehicle with respect to the relative wind direction is sensed between the two "best-pointing" pickup tubes by means of the difference in pressure across the tube with highest total pickup and the conjugate one with the lowest pickup. In this manner, up to 90°, approximately, the attitude of the boom and vehicle places one certain sensor so that it picks up the total pressure available (=impact plus static), and a cooperatively lying sensor, now pointing off the direction of the relative wind, will pick up more nearly correct static pressure, thus giving accurate readings at least through 60°, far beyond the conventional 20° or 25°.

Possibility of error due to boom flexure or deflection, arising from air and mechanical loads thereon can be compensated for by conducting physical or mechanical calibrations of the boom at different deflections with laboratory loadings that simulate actual flight loadings.

Errors due to boom misalignment because of wing tip bending and twisting can be precluded by the same type of calibration procedures.

Since the sensors lie well ahead of the vehicle's center of gravity, corrections and allowances for flight-path curvature, or loxodromic path, and for pitching velocity, can be calculated from well known aerodynamic equations or formulas.

Further, the effect of rolling velocity on the accuracy of angle of attack-pickup can also be calculated from known formulas and "built into," or allowed for in, the transducers and computers.

At superhypersonic velocities, it requires the cooperation of two conjugate tubes to yield $\alpha$ and $\beta$, or attack angle and sideslip angle but $\alpha$ responses will not affect $\beta$ responses.

The device will now be seen to be linearly responsive and to have the maximum sensitivity. For, flight and wind tunnel tests have demonstrated accuracy up to Mach=4.5 and up to 90° deviation from the original path except, perhaps, for the static orifices in the base of the head, which have not demonstrated high accuracy much above 60°.

Regarding the static orifices in the boom, although at certain angular attitudes one pair may pick up more airstream than the other pair, the pickup values are averaged in the chamber 42, thus obviating this difficulty. However, there are not two separate discrete static readings taken, one from orifices 24 and one from orifices 26; rather, they are compounded in the transducers.

If a 90° sensor is "out of proper lie" to make a total head pickup, the adjacent 45° sensor will not fail to make this pickup.

The orifices 24 accurately pick up absolute static pressure per se, without the aid of any sensor, up through at least 40°, while orifices 26 pick this variable up accurately up through at least 20°. Thereafter, cooperation of sensors is necessary.

The center sensor by itself responds accurately to Mach numbers, airspeed and altitude up through at least 20°. Thereafter, the $\Delta P$ of the cooperating center sensor and the "best" lying sensor responds for these variables, as well as for angles of attack and sideslip, at least in aircraft.

In missiles, the orifices 24 serve well for missile angular attitudes with respect to the relative wind and static pickup above 20°; in fact, from 20° to 90°, orifices 24 are quite accurate up to 60°–90°. However, orifices 26 in the boom serve these functions for missiles only up to about 20°.

The mutual interference between the sensors' own pressure fields is so very low as to be negligible, because of their angling and mutual spacing, etc., and the chamfering of their ends takes care of shock wave effects. Attack angle pickups are not appreciably affected by sideslip pickups.

It will be apparent to those skilled in the art that various changes and modifications may be made in the device disclosed herein without departing from the spirit of the invention, and it is intended that all such changes and modifications shall be embraced within the scope of the following claims.

I claim:

1. Means for picking up angle of attack, sideslip, Mach number, altitude and dynamic pressure during the flight of an air-vehicle, comprising: an elongate anterior body in the form of a solid of revolution; a hollow first sensor extending forwardly on the longitudinal center line of said body and opening forwardly to the airstream pressure to itself pick up pressures proportional to the airspeed, Mach number, dynamic pressure and altitude of the vehicle at attitudes of the vehicle up through substantially 25°; there being a ring of laterally opening sensors on the rear portion of the body each of said sensors comprising a separate port means open to the ambient atmosphere and including pressure sensor means for sensing the pressure of the atmosphere at each of said port means, and a ring of obliquely opening sensors lying medially between the first sensor, and the rearwardly located ring of sensors; the sensors, other than the first one, that are, by change of attitude of the vehicle, and change in direction of the relative wind, thereby pointed more aftwardly than forwardly with respect to said relative wind, then sensing static pressures and the sensors thereby pointed more forwardly than aftwardly with respect to the relative wind then sensing dynamic pressures, thereby to provide cooperative pairs to establish differential pressures that are proportional to the flow angle of the relative wind due to changed angle of attack, yaw, and sideslip.

2. Sensing means constituting part of an aerodynamic probe that includes a boom including conduit means therein, comprising: a spherico-cylindric head terminating the forward end of said boom, said head having a centrally extending bore opening forwardly; a hollow pickup member seated in said bore; a laterally extending bore located at each of the quadrantal points of the periphery of the cylindric side-surface of said head, each of said side-surface bores seating a hollow pickup member opening laterally of the head and extending substantially 90° to said side-surface; a plurality of bores each located on the forward portion of the head medially between the central bore and the adjacent side-surface bore; a sensor seated in each of the said medial bores and opening obliquely; and passages connecting each of said bores to the conduit means in the boom for transmitting air pressures rearwardly in the boom.

3. Sensing means according to claim 2 including mounting means for mounting said boom on an aircraft having wings extending laterally in opposite directions from a fuselage portion, and in which some of said medially located bores lie on the plane of the head which is parallel to the plane of lateral extension of said wings; the remainder of said medially located bores lying on the plane of the head perpendicular to said plane which is parallel to said laterally extending wings.

4. A sensing head, comprising: a spherico-cylindric solid of revolution and nine hollow pickup members thereon; one of said members being disposed on the forward end of the longitudinal center line of the spheric portion of the solid of revolution and opening axially forwardly; four of said nine members being disposed at quadrantal points on the periphery of the cylindric portion of said solid; and each of the remaining four such members being disposed at 45° points between the center member and the adjacent quadrantal member and substantially coplanar therewith.

5. Means for sensing certain variables during the passage of a vehicle through a fluid comprising: a body in the form of an elongate solid of revolution, having a major axis, a forwardly convex head having a foremost surface; a first tubular pick up member mounted in said head substantially coaxially thereof and opening forwardly of said foremost surface of said head; a plurality of second tubular pick up members disposed from a peripheral surface of said body substantially equidistantly from said first tubular pick up member and from each other, said second members opening laterally of said body; and a plurality of third tubular pick up members disposed from said peripheral surface of said head, each of said third members disposed substantially medially of the first member and one of said second members, said third tubular members extending radially outwardly of said convex head and opening obliquely with respect to said major axis.

6. Means for sensing certain variables during the passage of a vehicle through a fluid comprising: a body in the form of an elongate solid of revolution, having a major axis, a forwardly convex head having a foremost surface; a first tubular pick up member mounted in said head substantially coaxially thereof and opening forwardly of said foremost surface of said head; a plurality of second tubular pick up members disposed from a peripheral surface of said body substantially equidistantly from said first tubular pick up member and from each other, said second members opening laterally of said body; and a plurality of third tubular pick up members disposed from said peripheral surface of said head, each of said third members disposed substantially medially of the first member and one of said second members, said third tubular members extending radially outwardly of said convex head and opening obliquely with respect to said major axis, each of said tubular pick up members having a length, said first tubular pick up member being shorter than any of the other tubular pick up members and having a same effective diameter as any of said other tubular pick up members.

7. Means for sensing certain variables during the passage of a vehicle through a fluid comprising: a body in the form of an elongate solid of revolution, having a major axis, a forwardly convex head having a foremost surface; a first tubular pick up member mounted in said head substantially coaxially thereof and opening forwardly of said foremost surface of said head; a plurality of second tubular pick up members disposed from a peripheral surface of said body substantially equidistantly from said first tubular pick up member and from each other, said second members opening laterally of said body; and a plurality of third tubular pick up members disposed from said peripheral surface of said head, each of said third members disposed substantially medially of the first member and one of said second members, said third tubular members extending radially outwardly of said convex head and opening obliquely with respect to said major axis, said second tubular pick up members extending at substantially 90° to said peripheral surface of said body and said major axis.

8. Means for sensing certain variables during the passage of a vehicle through a fluid comprising: a body in the form of an elongate solid of revolution, having a major axis, a forwardly convex head having a foremost surface; a first tubular pick up member mounted in said head substantially coaxially thereof and opening forwardly of said foremost surface of said head; a plurality of a second tubular pick up members disposed from a peripheral surface of said body substantially equidistantly from said first tubular pick up member and from each other, said second members opening laterally of said body; and a plurality of third tubular pick up members disposed from said peripheral surface of said head, each of said third members disposed substantially medially of the first member and one of said second members, said third tubular members extending radially outwardly of said convex head and opening obliquely with respect to said major axis, said third tubular pick up members extending at an angle of substantially 45° to said first and second tubular pick up members and said third tubular members having a length substantially equal to that of said second tubular members and having a length greater than that of the first-said tubular member.

9. Means for sensing angles of attack and sideslip and for sensing a measure of Mach numbers, altitudes and dynamic pressure in a vehicle moving in an airstream, comprising: an elongate body in the form of a solid of revolution having a major axis and a forwardly convex head having a foremost surface and a rearward portion; a tubular first sensor extending forwardly from said foremost surface of said convex head and lying coaxially of said body, said first sensor opening forwardly to the airstream to sense pressures proportional to aerodynamic variables including total pressures, airspeeds, a measure of Mach numbers, dynamic pressures and altitude of said vehicle at attitudes of the vehicle relative to the airstream up to an angle of 25°; a plurality of tubular second sensors extending laterally outwardly from equidistantly spaced loci on a peripheral surface of the rearward portion of said body and opening laterally of the body, said second sensors being individually arranged to cooperate with said first sensor to sense pressure differentials indicative of at least one of the aforementioned aerodynamic variables at angles up through at least 60° of variation of the angle between the airstream and the attitude with respect thereto of the aircraft; a plurality of tubular third sensors extending radially outwardly from equidistantly spaced loci on said foremost surface of said body between said first tubular sensor and said second tubular sensors, each of said third tubular sensors lying substantially coplanar with and at substantially 45° to the adjacent ones of the first and second said tubular sensors, said third sensors being arranged individually to cooperate with said first sensor to sense pressure differentials indicative of angles of sideslip and attack at airflow angles of the vehicle to the airstream varying through at least 25°.

References Cited by the Examiner
UNITED STATES PATENTS

| | | | |
|---|---|---|---|
| 2,101,858 | 12/1937 | Knisley | 73—182 |
| 2,660,056 | 11/1953 | Schuck et al. | 73—180 |
| 2,662,402 | 12/1953 | Ince et al. | 73—180 |
| 2,888,827 | 6/1959 | Tondreau | 73—180 |
| 2,923,152 | 2/1960 | Mabry et al. | 73—180 X |
| 2,923,153 | 2/1960 | Westman | 73—182 |
| 2,986,933 | 6/1961 | Summerlin et al. | 73—178 X |

ROBERT B. HULL, *Primary Examiner.*

LOUIS R. PRINCE, *Examiner.*